US005918212A

United States Patent [19]
Goodwin, III

[11] Patent Number: 5,918,212
[45] Date of Patent: Jun. 29, 1999

[54] ELECTRONIC PRICE LABEL PRICE SYNCHRONIZATION SYSTEM AND METHOD

[75] Inventor: John C. Goodwin, III, Suwanee, Ga.

[73] Assignee: NCR Corporation, Dayton, Ohio

[21] Appl. No.: 08/902,023

[22] Filed: Jul. 29, 1997

[51] Int. Cl.[6] ................................................. G06F 17/60
[52] U.S. Cl. ................................. 705/20; 705/16; 705/23
[58] Field of Search ................................ 705/20, 23, 16; 186/59, 61

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,707,785 | 11/1987 | Takagi | 364/405 |
| 4,841,442 | 6/1989 | Hosoyama | 364/405 |
| 4,843,546 | 6/1989 | Yoshida et al. | 364/403 |
| 4,879,649 | 11/1989 | Ishii | 364/405 |
| 4,924,363 | 5/1990 | Kornelson | 362/125 |
| 5,172,314 | 12/1992 | Poland et al. | 364/401 |
| 5,448,226 | 9/1995 | Failing, Jr. et al. | 340/825.35 |
| 5,493,107 | 2/1996 | Gupta et al. | 235/383 |
| 5,734,839 | 3/1998 | Enoki et al. | 395/220 |
| 5,794,211 | 8/1998 | Goodwin, III et al. | 705/23 |
| 5,797,131 | 8/1998 | Goodwin, III et al. | 705/16 |

*Primary Examiner*—Eric W. Stamber
*Assistant Examiner*—Akiba Robinson-Boyce
*Attorney, Agent, or Firm*—Paul W. Martin

[57] ABSTRACT

An electronic price label (EPL) price synchronization system and method which increase price reliability while conserving system bandwidth. A storage medium contains an audit file containing scheduled price change messages. The storage medium may additionally contain an EPL data file containing correct price information or a price file containing correct price information. A computer terminal reads the audit file to obtain an item identification number for an item associated with the EPL from a price change message addressed to the EPL, determines the correct price of the item from either the EPL data file or the price file, sends the correct price information to the EPL, receives a comparison result from the EPL following comparison of the correct price information to displayed price information by the EPL, determines from the comparison result whether the displayed price equals the correct price, and if the correct price is not equal to the displayed price sends another price change message containing the correct price to the EPL.

8 Claims, 5 Drawing Sheets

ELECTRONIC PRICE LABEL PRICE SYNCHRONIZATION SYSTEM AND METHOD

BACKGROUND OF THE INVENTION

The present invention relates to electronic price label (EPL) systems, and more specifically to an electronic price label (EPL) price synchronization system and method.

In a traditional retail store, bar code readers rely on price information maintained within a price-lookup (PLU) file. The PLU file is typically stored in a single location at host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server.

Price mismatch can occur in EPLs if the price in the PLU data file is different than the price displayed by an EPL. Once the price mismatch is detected, the typical method of recovering is to create and execute a price change request.

In a first type of system, information about the EPLs is typically maintained in an EPL data file. The EPL data file contains EPL identification information, item information, and a price checksum which allows EPL price information to be verified. The price checksum is calculated from price information in the PLU file. A price verifier program determines the error by obtaining displayed price information from an EPL and comparing the displayed price information to price information within the checksum.

In a second type of system, the EPL identification number is equal to the PLU number of the item associated with the EPL. No EPL data file is maintained and no checksum verification is possible.

Therefore, it would be desirable to provide an EPL price synchronization system and method which can ensure that the price information in the PLU file is the same price information that is displayed by the EPLs more quickly than store personnel.

SUMMARY OF THE INVENTION

In accordance with the teachings of the present invention, an electronic price label (EPL) price synchronization system and method are provided.

The system includes a storage medium and a computer terminal. The storage medium contains an audit file containing scheduled price change messages. The storage medium may additionally contain an EPL data file containing correct price information or a price file containing correct price information. The computer terminal reads the audit file to obtain an item identification number for an item associated with the EPL from a price change message addressed to the EPL, determines the correct price of the item from either the EPL data file or the price file, sends the correct price information to the EPL, receives a comparison result from the EPL following comparison of the correct price information to displayed price information by the EPL, determines from the comparison result whether the displayed price equals the correct price, and if the correct price is not equal to the displayed price sends another price change message containing the correct price to the EPL.

A method of ensuring that a price displayed by an electronic price label (EPL) is a correct price of an item relies on either an EPL data file containing correct price information or a price file containing correct price information. The method includes the steps of reading a record of a price change message to the EPL to obtain an item identification number for the item by a computer, determining whether an EPL data file containing correct price exists, if the EPL data file exists and contains correct price, obtaining the correct price from the EPL data file, if the EPL data file exists but does not contain correct price obtaining the correct price from a price file, if the EPL data file does not exist obtaining the correct price from a price file, sending the correct price to the EPL by the computer, comparing the correct price to the displayed price by the EPL to produce a comparison result, sending the comparison result to the computer by the EPL, determining from the comparison result whether the displayed price equals the correct price by the computer, and if the correct price is not equal to the displayed price sending another price change message containing the correct price to the EPL by the computer.

It is accordingly an object of the present invention to provide an electronic price label (EPL) price synchronization system and method.

It is another object of the present invention to provide an electronic price label (EPL) price synchronization system and method which ensure that a price for an item displayed by an EPL is a correct price.

It is another object of the present invention to provide an electronic price label (EPL) price synchronization system and method which increase the reliability of displayed prices.

It is another object of the present invention to provide an electronic price label (EPL) price synchronization system and method which conserve system bandwidth.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
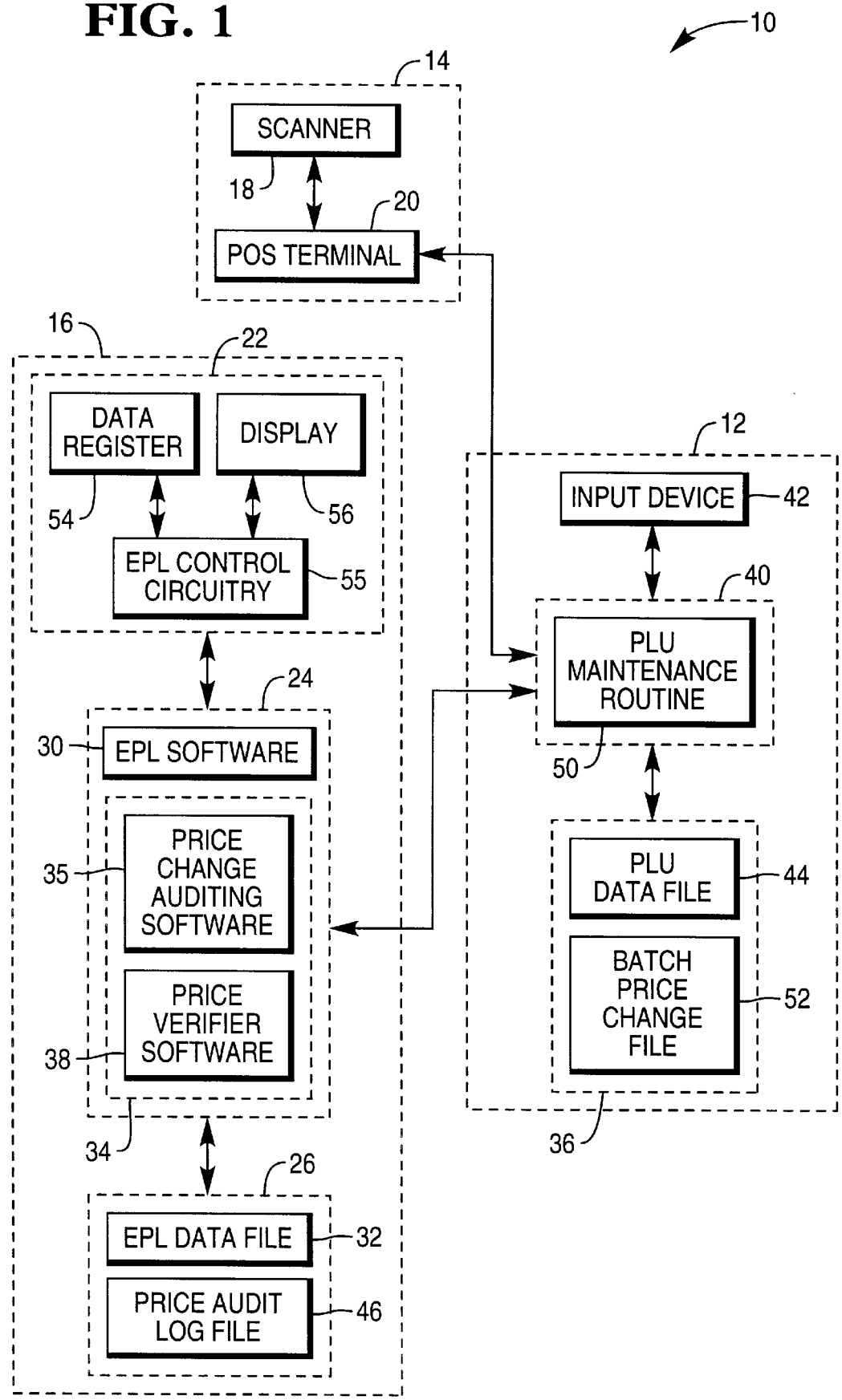
FIG. 1 is a block diagram of a transaction management system.

Referring now to FIG. 1, a transaction management system 10 primarily includes host computer system 12, point-of-service (POS) system 14, and EPL system 16.

Host computer system 12 includes storage medium 36, host PLU terminal 40, and input device 42.

Storage medium 36 stores PLU data file 44. PLU file 44 is preferably the sole location for storing item prices and is available for distribution to POS terminal 20 by host PLU terminal 40. Alternatively, provision may be made for bar code scanner 18 to directly access primary PLU file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Host PLU terminal 40 executes PLU maintenance routine 50. PLU maintenance routine 50 updates PLU file 44.

Input device 42 is preferably a keyboard.

PLU maintenance routine 50 may send changes in price in PLU file 44 directly to EPL terminal 24 and POS terminal 20 as they are entered in input device 42 (immediate processing) or store price changes within a batch file 52 in storage medium 26 for later batch updating (batch processing).

PLU data file 44 includes a line entry for each item sold in the store. Each line entry has an item identification entry (ITEM ID), and a PLU price entry (PLU PRICE). Entry ITEM ID identifies a store item. Entry PLU PRICE identifies the price read by POS system 14 to determine the price of each item during scanning by bar code scanner 18.

POS system 14 includes bar code scanner 18 and terminal 20.

EPL system 16 primarily includes EPLs 22, host EPL terminal 24, and EPL storage medium 26.

EPLs 22 are typically attached to shelves within a store and include data register 54, EPL control circuitry 55, and display 56. Data registers 54 contain data, usually the price of an item associated with an EPL on the shelves. The data is typically displayed by display 56. EPL control circuitry 55 controls operation of the EPL, including the performance of display verification checks using checksums transmitted to it from host EPL terminal 24.

Host EPL terminal 24 executes EPL software 30 and price synchronization software 34. EPL software 30 schedules price change messages for transmission to EPLs 22 and produces an entry in price audit log file 46 each time it schedules a price change message for transmission.

Today, many configurations of EPL systems exist. The present invention attempts to address three of them. In first and second configurations, price synchronization software 34 provides price verifier and price change auditing functions. In the third configuration, there is no EPL data file 32 or equivalent and price verification functions are not performed by price synchronization software 34. In all three configurations, price synchronization software 34 is preferably a single software module.

Price verification involves a comparison of PLU prices to EPL displayed prices. Price verification is enabled by the presence of an EPL data file 32 containing price check information. Of course, the present embodiment envisions that price check information can be stored elsewhere. Price verifier software 38 compares a price checksum in EPL data file 32 with a price checksum it calculates using the price in PLU data file 44 and generates a price change request when the calculated checksum does not equal the stored checksum.

One of the advantages associated with conducting price verification using checksum information is that it facilitates recovery from a disaster situation (e.g., PLU file 44 becoming lost and in need of replacement) with only minimal communications to EPLs 22.

Price change auditing involves monitoring a price audit log file 46 for price change messages scheduled for transmission, reading price information from PLU data file 44, querying an EPL for displayed price information, and comparing the price information in PLU data file 44 with the displayed price information. Price change auditing software 34 performs the price change audit function.

In the first and second configurations, EPL software 30 maintains the contents of an EPL data file 32. EPL data file 32 includes a line entry for each EPL 22 in EPL system 16. Each line entry has an item identification entry (ITEM ID) and an EPL identification entry (EPL ID). Entry ITEM ID identifies a store item. Entry EPL ID identifies which EPL is assigned to the item.

In only the first configuration, each line entry additionally includes price information, which is preferably in the form of a checksum entry (EPL CHECK). Entry EPL CHECK is a checksum value of the digits of the price information that is displayed by display 56.

EPL storage medium 26 stores EPL data file 32 and price audit file 46 and is preferably a fixed disk drive.

During normal system operation, EPL terminal 24 obtains price information from PLU data file 44 and sends it to data register 54. Display 56 displays the price in data register 54. During a price mismatch situation, the price information from PLU data file 44 does not agree with the price displayed by EPL.

Figure 2A:
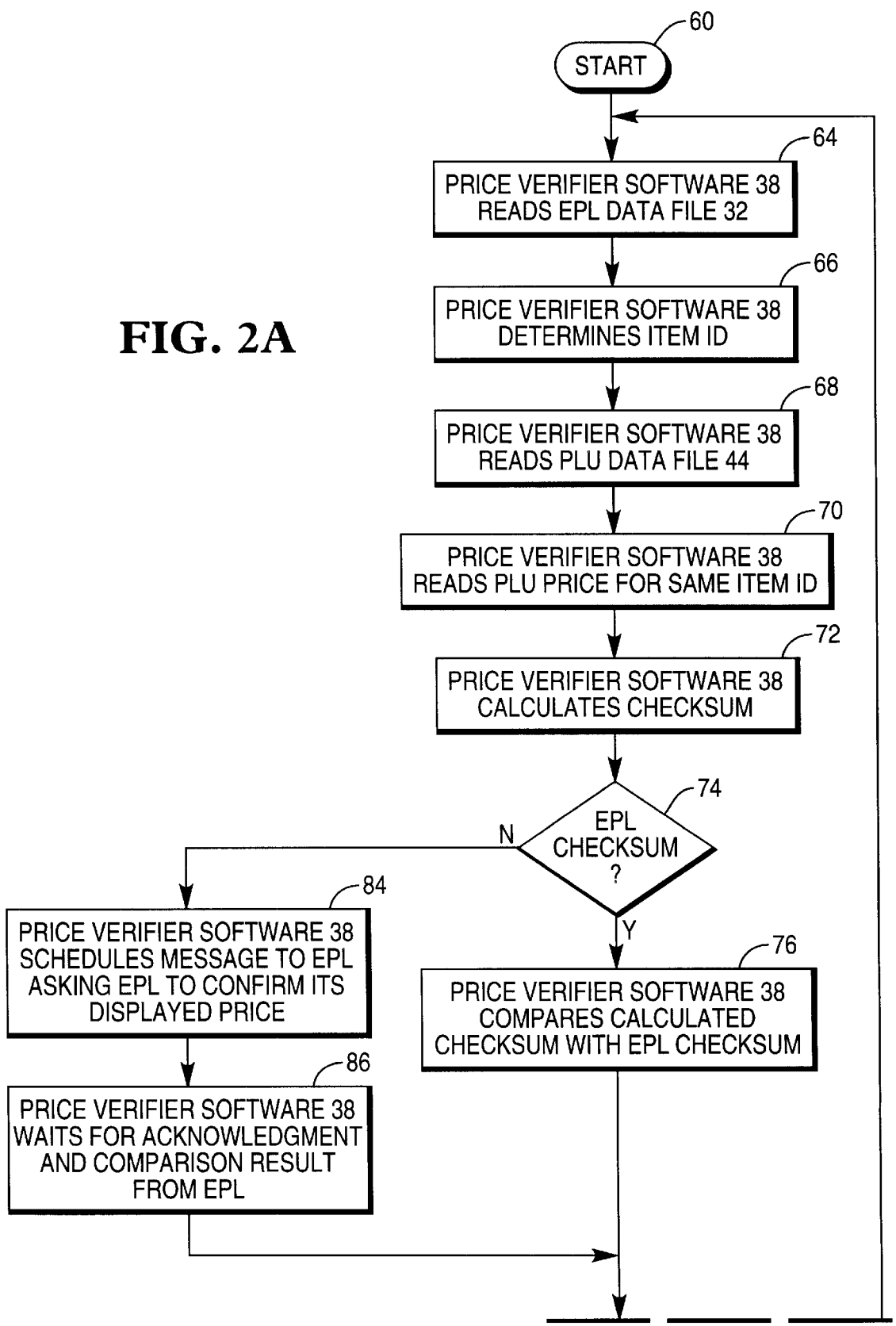
FIGS. 2A and 2B is a flow diagram illustrating the operation of price verifier software.
Figure 2B:
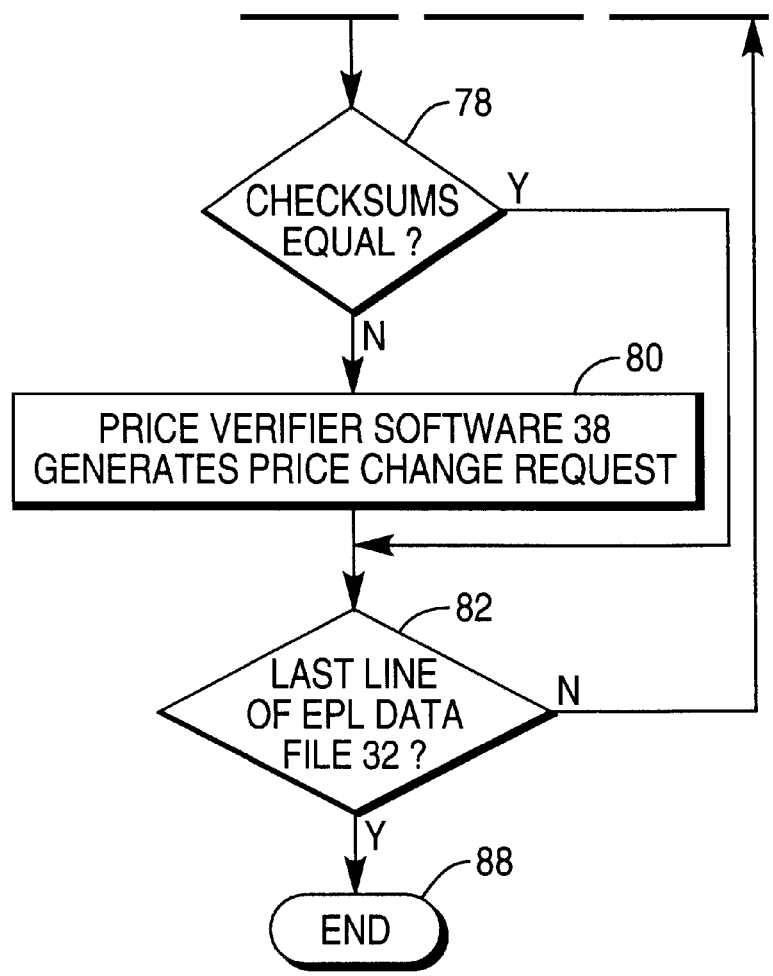

Turning now to FIGS. 2A and 2B, operation of price verifier software 38 is illustrated beginning with START 60.

In step 62, price verifier software 38 reads EPL data file 32.

In step 64, price verifier software 38 examines entry ITEM ID.

In step 66, price verifier software 38 reads PLU data file 44.

In step 68, price verifier software 38 reads the line entry in PLU data file 44 having the same ITEM ID entry as the one read from EPL data file 32.

In step 70, price verifier software 38 examines entry PLU PRICE in the line entry from PLU data file 44.

In step 72, price verifier software 38 calculates a checksum value for PLU PRICE.

In step 74, price verifier software 38 compares the calculated checksum value for entry PLU PRICE with the entry EPL CHECK. If the calculated checksum value is not the same as the EPL CHECK entry, the price for the item having ITEM ID is not the same in both EPL data file 32 and PLU data file 44. Price mismatch has occurred between the price for the item displayed by its EPL and the price that would be tallied by POS system 14.

In step 78, price verifier software 38 generates a price change request for changing the displayed price to the PLU price and updates the checksum value in entry EPL CHECK in EPL data file 32. This request may be an immediate request or part of a batch of requests stored in batch price change file 52.

In step 80, the method determines whether the last line entry of EPL data file 32 has been read. If so, the method ends at step 82. If not, the method returns to step 62 to read another line entry from EPL data file 32.

Returning to step 74, if the calculated checksum value is the same as the EPL CHECK entry, the price for the item having ITEM ID is the same in both EPL data file 32 and PLU data file 44. Price mismatch has not occurred between the price for the item displayed by its EPL and the price that would be tallied by POS system 14. The method proceeds to step 80.

Figure 3A:
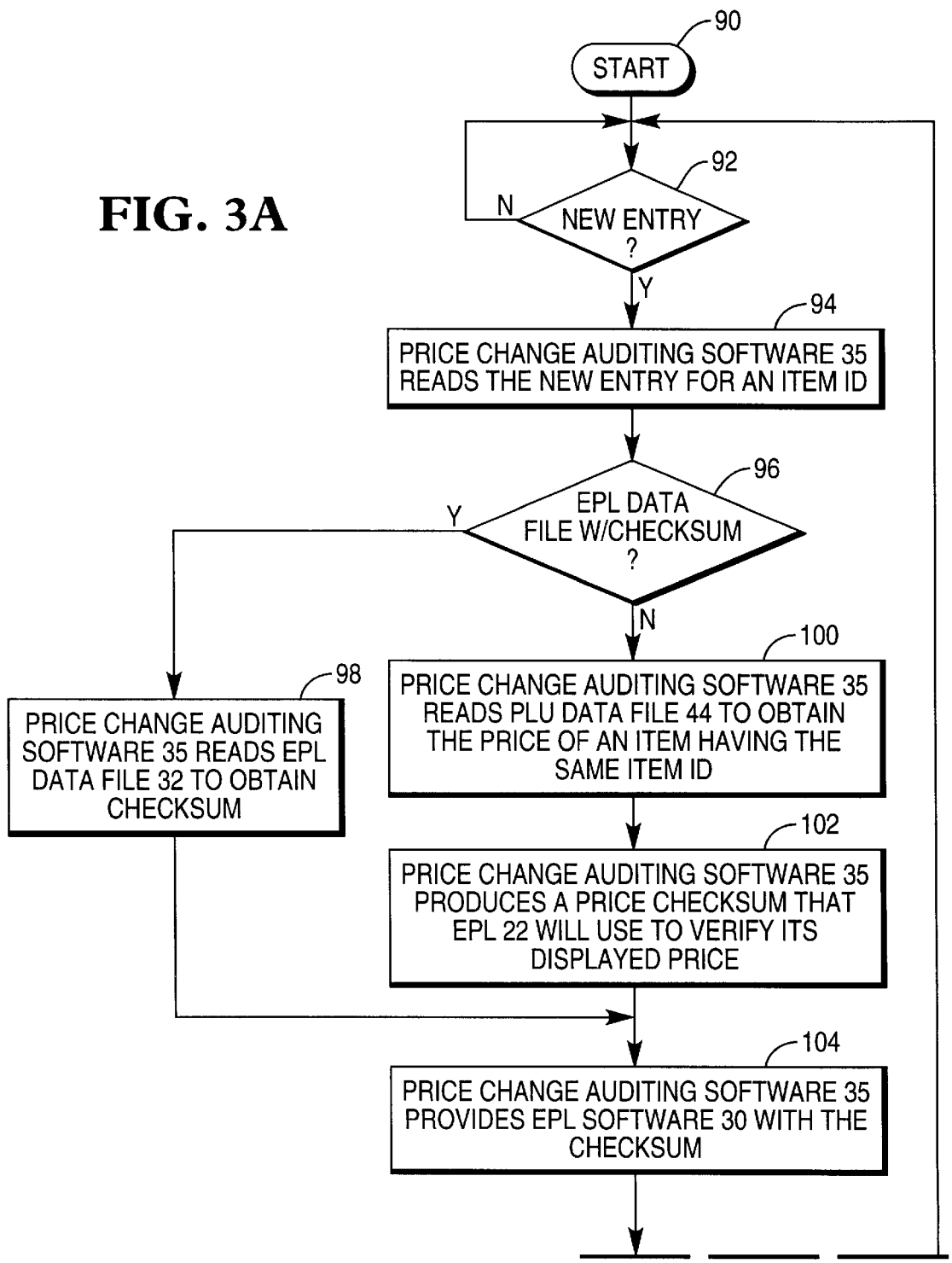
FIGS. 3A and 3B is a flow diagram illustrating the operation of price change auditing software.
Figure 3B:
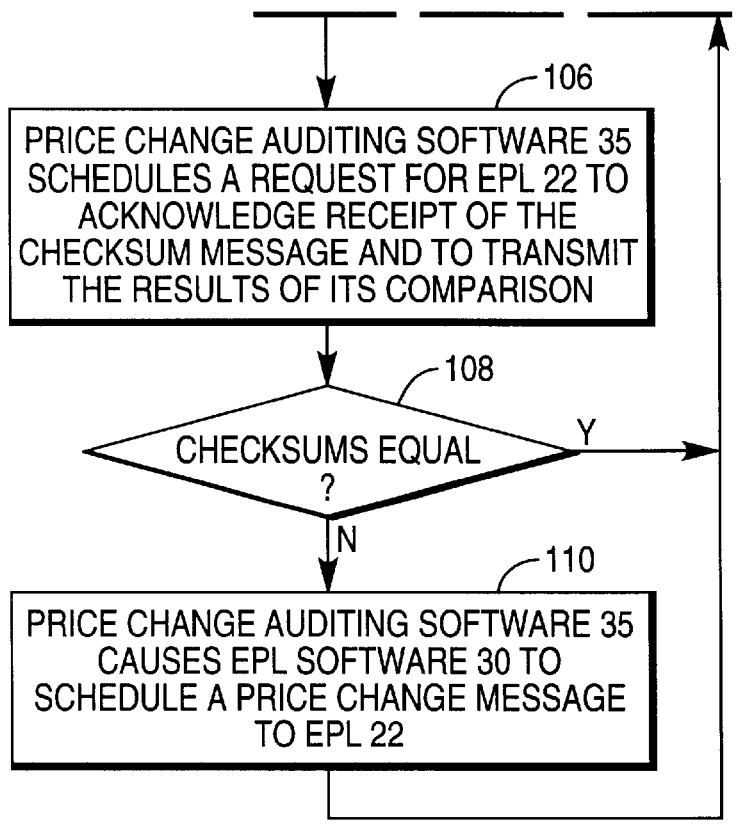

Turning now to FIGS. 3A and 3B, operation of price change auditing software 38 is illustrated beginning with START 90. Price change auditing software 35 examines price audit log file 46 for evidence of price change requests generated in step 98 and tests the correctness of the displayed price.

In step 92, price change auditing software 35 monitors for an entry in price audit log file 46. If EPL software 30 does not make a new entry in price audit file 46, operation proceeds back to step 92. If EPL software 30 makes a new entry in price audit file 46, operation proceeds to step 94.

In step 94, price change auditing software 35 reads the new entry for an ITEM ID.

In step 96, price change auditing software 35 determines whether EPL data file 32 exists and includes an entry EPL CHECK. If EPL data file 32 exists and includes an entry EPL CHECK, operation proceeds to step 98. If EPL data file 32 exists but does not include entry EPL CHECK, operation proceeds to step 100. If EPL data file 32 does not exist, operation proceeds to step 98.

In step 98, price change auditing software 35 obtains entry EPL CHECK from EPL data file 32 and operation proceeds to step 104.

In step 100, price change auditing software 35 reads PLU data file 44 to obtain the price of the item.

In step 102, price change auditing software 35 produces a price checksum that EPL 22 will use to verify its displayed price.

In step 104, price change auditing software 35 provides EPL software 30 with the checksum. EPL software 30 sends the checksum to EPL 22 with a command to compare the checksum to a checksum of its displayed price. EPL 22 receives the checksum, calculates a checksum of its displayed price, and compares the received checksum with the calculated checksum.

In step 106, price change auditing software 35 schedules a request for EPL 22 to acknowledge receipt of the checksum message and to transmit the results of the comparison. EPL 22 receives the request and returns the comparison results.

In step 108, price change auditing software 35 examines the comparison results. If the checksum calculated by EPL 22 is not the same as the checksum it received, then price change auditing software 35 causes EPL software 30 to schedule a price change message containing a correct price to EPL 22 in step 110.

If the checksum calculated by EPL 22 is the same as the checksum it received, then price change auditing software 35 returns to step 92 to monitor for new entries in price audit log file 46.

Advantageously, the present invention increases system reliability while conserving bandwidth. Regardless of the presence of a price checksum or EPL data file 32, price change auditing software 35 determines the correctness of displayed prices. Price change auditing software 35 does not require constant polling of EPLs.

Although the present invention has been described with particular reference to certain preferred embodiments thereof, variations and modifications of the present invention can be effected within the spirit and scope of the following claims.

We claim:

1. A method of ensuring that a price displayed by an electronic price label (EPL) is a correct price of an item, comprising the steps of:

(a) reading a record of a price change message to the EPL to obtain an item identification number for the item;

(b) determining the correct price of the item;

(c) comparing the correct price to the displayed price by the EPL; and (d) if the correct price is not equal to the displayed price, sending another price change message to the EPL to change the displayed price to the correct price.

2. The method as recited in claim 1, wherein step (b) comprises the substep of:

(b-1) determining the correct price from a price file.

3. The method as recited in claim 1, wherein step (b) comprises the substep of:

(b-1) determining the correct price from an EPL data file.

4. A method of ensuring that a price displayed by an electronic price label (EPL) is a correct price of an item, comprising the steps of:

(a) reading a record of a price change message to the EPL to obtain an item identification number for the item by a computer;

(b) determining the correct price of the item from a price file by the computer;

(c) sending the correct price to the EPL by the computer;

(d) comparing the correct price to the displayed price by the EPL to produce a comparison result;

(e) sending the comparison result to the computer by the EPL;

(f) determining from the comparison result whether the displayed price equals the correct price by the computer; and (g) if the correct price is not equal to the displayed price, sending another price change message containing the correct price to the EPL by the computer.

5. A method of ensuring that a price displayed by an electronic price label (EPL) is a correct price of an item, comprising the steps of:

(a) reading a record of a price change message to the EPL to obtain an item identification number for the item by a computer;

(b) determining the correct price of the item from an EPL data file by the computer;

(c) sending the correct price to the EPL by the computer;

(d) comparing the correct price to the displayed price by the EPL to produce a comparison result;

(e) sending the comparison result to the computer by the EPL;

(f) determining from the comparison result whether the displayed price equals the correct price by the computer; and (g) if the correct price is not equal to the displayed price, sending another price change message containing the correct price to the EPL by the computer.

6. A method of ensuring that a price displayed by an electronic price label (EPL) is a correct price of an item, comprising the steps of:

(a) reading a record of a price change message to the EPL to obtain an item identification number for the item by a computer;

(b) determining whether an EPL data file containing correct price exists;

(c) if the EPL data file exists and contains correct price, obtaining the correct price from the EPL data file before proceeding to step (f);

(d) if the EPL data file exists, but does not contain correct price, obtaining the correct price from a price file before proceeding to step (f);

(e) if the EPL data file does not exist, obtaining the correct price from a price file;

(f) sending the correct price to the EPL by the computer;

(g) comparing the correct price to the displayed price by the EPL to produce a comparison result;

(h) sending the comparison result to the computer by the EPL;

(i) determining from the comparison result whether the displayed price equals the correct price by the computer; and (j) if the correct price is not equal to the displayed price, sending another price change message containing the correct price to the EPL by the computer.

7. A system for ensuring that a price displayed by an electronic price label (EPL) is a correct price of an item comprising:

a computer system coupled to the EPL, including a terminal and a storage medium coupled to the terminal;

wherein the storage medium contains an EPL data file, which contains EPL identification information and correct price information, and an audit file containing scheduled price change messages;

wherein the computer terminal reads the audit file to obtain an item identification number for the item from a price change message addressed to the EPL, determines the correct price of the item from the EPL data file, sends the correct price information to the EPL, receives a comparison result from the EPL following comparison of the correct price information to displayed price information by the EPL, determines from the comparison result whether the displayed price equals the correct price, and if the correct price is not equal to the displayed price sends another price change message containing the correct price to the EPL.

8. A system for ensuring that a price displayed by an electronic price label (EPL) is a correct price of an item comprising:

a computer system coupled to the EPL, including a terminal and a storage medium coupled to the terminal;

wherein the storage medium contains a price file, which contains correct price information, and an audit file containing scheduled price change messages;

wherein the computer terminal reads the audit file to obtain an item identification number for the item from a price change message addressed to the EPL, determines the correct price of the item from the price file, sends the correct price information to the EPL, receives a comparison result from the EPL following comparison of the correct price information to displayed price information by the EPL, determines from the comparison result whether the displayed price equals the correct price, and if the correct price is not equal to the displayed price sends another price change message containing the correct price to the EPL.

* * * * *